Patented June 23, 1953

2,643,190

UNITED STATES PATENT OFFICE 2,643,190

PROCESS FOR ROASTING AND SALTING NUTS

Frank E. Hageman, Chico, Calif.

No Drawing. Application November 18, 1950, Serial No. 196,528

4 Claims. (Cl. 99—127)

This invention relates to a process for roasting and salting nuts, and to the resultant product.

One of the objects of the invention is a process for roasting and salting nuts without requiring the use of oil or fat in the roasting or salting step, thus eliminating the chance for rancidity of oil or fat to develop.

Another object of the invention is the provision of a process for salting nuts, such as almonds and other nuts having similar characteristics, and fixing such salt in the nuts during the roasting process, whereby there will be no loose or free salt and also whereby such nuts may be polished without losing their salted flavor.

A still further object of the invention is the provision of a salted, roasted nut that is uniformly flavored with salt and which salt is fixed in the nut so as not to become lost by rubbing with other nuts during handling and shipping in cans, cartons or bags, and also, which nut is free from oils or fats foreign to the nut and are clean and may be handled without contaminating the fingers.

The usual present commercial process for roasting nuts is to roast them in oil, such as cottonseed or other oil, after which they are salted and packed. In homes shelled nuts are usually roasted in an oven or on the stove in the presence of some fat, such as butter, although they are sometimes roasted in the commercial manner in oil. After roasting, the nuts are salted. A thin film of oil forms an adherent for the salt. Unshelled nuts that are roasted in the shell, such as peanuts, are not salted.

The nuts that are roasted in the commercial way must be eaten promptly or the oil or fat that is adhered thereto will become rancid. Also, such nuts are not usually uniformly salted, inasmuch as some of the salt adhered thereto will drop off and such salt as may be dissolved in the oil or fat will tend to drain off.

A further very noticeable fact is that there is a considerable waste in the salt used for salting nuts commercially. For example, in the case of hermetically sealed cans of nuts, after the nuts have been emptied, there is a considerable residence of loose salt, or salt in oil or fat.

It is also a fact that heretofore the salting of nuts has followed the polishing step for the obvious reason that the salt would be removed by said step if the salt were first applied, even though it were adhered thereto by some surface applied oil or fat.

One of the objects of the present invention is a process that will overcome all of the above objections.

As to the product resulting from the present process, the nuts have a distinctive pleasing crispness not heretofore obtained and are full flavored and uniformly salted, and without the taint or suggestion of oil or fat that is foreign to the nut itself, for the reason that no such oil or fat is present. Thus the nuts will keep and their keeping characteristics are even better than with unroasted nuts for the reason that some of the ingredients of the nuts themselves that may tend to deteriorate with age when subjected to the atmosphere, are changed in the roasting process.

Other objects and advantages will appear in the description.

In detail, a saline solution of about 20% common salt (sodium chloride) and about 80% water is provided, which will be called a 20% salt solution. This solution is preferably formed by heating the water to about 200° F. and then adding the salt and stirring the water until the salt is dissolved therein.

The above 20% salt solution at a temperature of about 80° F. is the solution in which the nuts, with their skins on them, are immersed for a period of about 5 minutes, with gentle agitation in order to insure uniform application of the solution to the nuts during said five minute period.

The nuts are next removed from the solution and are passed through a conventional drying drum in order to remove the free surface moisture from the nuts in the shortest time.

At the end of this drying step, while the surface moisture is gone and the surfaces of the nuts are completely dry, there is still some of the solution moisture in the skin. It is therefore to be understood that the drying step merely dries off the surface of the skin but does not remove all of the solution that has soaked into the skin. The purpose of drying the skin is to prevent the nuts from sticking to the roaster walls. However, it is essential that a residue of the moisture (solution) remains in the skin at the time of the following roasting step, as will hereinafter appear, and for that reason the nuts should be subjected to the roasting step before such moisture has evaporated or has substantially evaporated.

After the free surface moisture has been removed from the nuts, they are placed within an electric or gas heated high pressure, rotating cylinder, steel roaster that has been heated to about 180° F. before the roaster is loaded, and the roaster is preferably filled to about ⅔ of its capacity to allow for agitation of the nuts during said roasting step.

After the roaster is loaded, it is closed and the heat is continued until the pressure has reached 210 lbs. per square inch. As soon as this pressure is reached, the heat is turned off and the pressure valve is opened to reduce the pressure. As soon as the pressure is down to about 5 lbs. per square inch, the roaster is opened and the nuts are removed therefrom.

This release of pressure through the valve before opening the roaster makes possible the removal of the nuts without danger of damage to product or operator. With this precaution, the physical characteristics of the nuts are the same as at the start, except that the nuts are roasted to the desired degree and the salt that was in the moisture is driven ino the nuts.

The reduction in pressure after the pressure has reached 210 lbs. per square inch, should be done as rapidly as possible without impairing the physical characteristics of the nuts, in order to prevent over roasting, and also the nuts should be rapidly cooled immediately after removal from the gun until their temperature is about 80° F. A conventional air cooling system is suitable for this step.

Immediately after the nuts have been cooled to say 80° F., they may be passed through a conventional vacuum cleaning and polishing system. This polishing and cleaning step is preferably done while the nuts are warm, or say about 80° F., because at such temperature the natural oil of the nut is warm and releases dust and other substance more readily than after the nuts are cold.

For best results the nuts should be packaged in vacuum sealed tins immediately after they have been cleaned and polished to avoid the product absorbing such moisture as would be absorbed from the air after cooling, although any of the usual packaging materials for nuts may be used, such as regenerated cellulose bags or bags of rubber hydrochloride or chlorinated rubber.

The temperatures and times given above are those that are preferred. Obviously they may be varied. For example, the temperature of the salt solution in which the nuts are soaked may be from about 70° F. to about 80° F. and the time of immersion may vary accordingly. The hotter the solution, the shorter the time required. The important thing is that the temperature of the solution and the time of immersion should not be so hot and so long as to cause the skins on the nuts to peal off or break away.

The strength of the salt solution may vary somewhat, but the strength herein given is preferred in most instances, the desired result being to uniformly salt the nuts with a predetermined amount for each pound of nuts. In this way the user will not find some nuts too salty and others not salty enough.

As to the roasting step, it is apparent that the temperature and pressure may vary. Where a pressure roaster 12 feet in length and 12 inches in diameter with walls 4½ inches in thickness is loaded to ⅔ capacity and at a starting temperature of the air or space within said roaster at about 180° F., the pressure of 210 lbs. per square inch will be reached within about 7 to 9 minutes where the nuts are unskinned almonds of average size. If the gun were to be only half loaded, it is obvious that a longer time would be required to raise the roasting pressure and temperature to the desired degree. And certain nuts may require different times and temperatures.

Anyone skilled in the art can readily determine exactly when the nuts, of whatever kind, are roasted. Some concerns roast the nuts sold by them more than others.

The steps that must be included are the deposition of the sodium chloride solution in the skins of the nuts so that they will hold a quantity of the same after the surface moisture is removed, then the enclosing of the nuts having said solution within their skins within an enclosed heated space, and then applying sufficient heat to within said space to elevate the temperature therein to at least the boiling point of water at the pressure that is created within said space until said nuts are roasted to the desired degree, and then stopping the roasting. As long as the temperature within the enclosed space is at least that of the boiling point of water at whatever pressure is created through the conversion of the water into steam, there will be no condensation and when the relief valve is opened the steam will be exhausted. Hence it is impossible to define exactly the roasting time, and the pressure and temperature to meet every condition, but the fundamental steps as above outlined can be readily practiced by anyone skilled in the art.

It may be pointed out that while the roasting may be carried out by first enclosing the nuts in a cold apparatus, the nuts will be too dry and tough, because the nuts will be subjected to too long a drying period before the moisture is converted into steam. By heating the roaster to within about 20 to 40 degrees of the boiling point of water, preferably 180°, the boiling temperature of water will be quickly reached and with it the rise in temperature and pressure resulting from the conversion of the water into steam.

In the final product, the solid salt residue from the solution is driven into the nut itself due to the pressure applied to the nuts in the roasting step. The flavor and texture are not impaired by reason of oils or fats that are foreign to the nuts and because of the manner in which the salt is applied and distributed.

The final cooling of said nuts from about the roasting temperature to about 80° F. should be preferably accomplished in from about 1 to 2 minutes time to insure against over roasting. Also the time for drop in the final pressure in the roaster to atmospheric pressure or to about 5 lbs. per square inch, should be accomplished at about the rate of 25 lbs. per second.

The reason the roaster is opened before atmospheric pressure is finally reached or at about 5 lbs. per square inch is to reduce the time between the end of the roasting step and the cooling step to a minimum, and the opening of the gun while the pressure therein is still at about 5 lbs. per square inch is not detrimental to the nuts. For all practical purposes, the pressure may be said to be at substantially atmospheric pressure when the gun is opened.

I claim:

1. The process of roasting and salting shelled, unskinned nuts comprising the steps of: adding an aqueous sodium chloride solution to the skin of said nuts at atmospheric pressure for absorption of said solution by said skins, then enclosing said nuts having said solution in their skins within a preheated space the temperature of which is substantially above that of the boiling point of water at atmospheric pressure at the time said nuts are so enclosed, then raising the heat within said space sufficiently to elevate the temperature therein to at least the boiling point of water at the pressure created within said space created solely through the conversion of the water in said skins and nuts into steam and keeping said nuts in said space and at said temperature and pressure until they are roasted to the desired degree, thereafter exhausting said steam and removing said nuts from said enclosed space and rapidly cooling them.

2. The process of roasting and salting shelled, unskinned nuts that includes the steps of; soaking said nuts in a substantially saturated aqueous sodium chloride solution at atmospheric pressure until said solution has penetrated into the skin of said nuts thereafter removing said nuts from said solution and removing the free surface moisture only from said skins leaving within the latter that which has been absorbed thereby, then enclosing said nuts having said solution within their skins within an enclosed preheated space having a temperature relatively close to but below 212° F. at the time said nuts are enclosed therein, then raising the temperature of said space and the nuts enclosed therein to at least the boiling point of water at whatever pressure is created within said space due solely to the conversion of the water in said skins and nuts to steam and holding said nuts within said space at said temperature and pressure until they are roasted to the desired degree, thereafter relatively rapidly reducing said pressure to atmospheric pressure and immediately removing said nuts from said space and rapidly cooling them to about atmospheric temperature at a rate substantially faster than would occur through exposure of said nuts to the atmosphere.

3. The process of roasting and salting shelled, unskinned nuts that comprises the steps of; immersing said nuts in a substantially saturated aqueous solution of sodium chloride at atmospheric pressure for a period of about five minutes and immediately thereafter removing said nuts from said solution and removing the free surface moisture only from their skins leaving therein the amount absorbed by said skins during said immersion, then enclosing said nuts within an enclosed, preheated space the temperature of which at the time of said enclosure of said nuts therein is below but relatively close to the temperature of the boiling point of water at atmospheric pressure, thereafter elevating the temperature within said space to at least the temperature of boiling water at the pressure solely created within said space due to the conversion of the water within said skins and nuts to steam and holding said nuts within said space at said temperature and pressure until they are roasted to the desired degree, then rapidly but progressively exhausting the gases within said space until substantially atmospheric pressure is reached and immediately thereafter cooling said nuts to about 80° F. within a period of from about one to two minutes.

4. The process of roasting and salting shelled, unskinned nuts that comprises the steps of immersing said nuts for about five minutes in a substantially saturated aqueous solution of sodium chloride that is at a temperature of about 80° F., thereafter removing said nuts from said solution and removing the free surface moisture only from said skins leaving the moisture of absorption within the skins, then enclosing said nuts with said moisture of absorption within said skins within an airtight space that is at a temperature of about 180° F. at the time said nuts are enclosed therein, the volume of nuts so enclosed being adapted to fill substantially two thirds of said space, then elevating the temperature within said space to at least the boiling point of water at the pressure created within said space due solely to the conversion of said moisture of absorption into steam and until said pressure is substantially 210 lbs. per square inch, holding said nuts within said space at said temperature and pressure until they are roasted to the desired degree, and thereafter rapidly but progressively exhausting the gases within said space to about atmospheric temperature and rapidly cooling said nuts to about 80° F.

FRANK E. HAGEMAN.

References Cited in the file of this patent

UNITED STATES PATENTS

| Number | Name | Date |
|---|---|---|
| 713,918 | Potter | Nov. 18, 1902 |
| 1,505,605 | Sawkins | Aug. 19, 1924 |
| 1,585,128 | Smith | May 18, 1926 |